(No Model.)
R. GÄBEL.
CUTTING TOOL.
No. 448,017.  Patented Mar. 10, 1891.
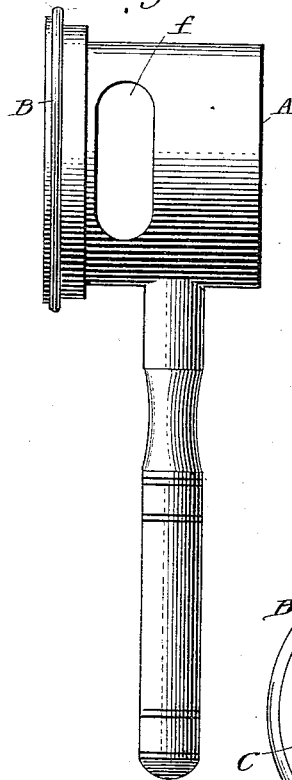
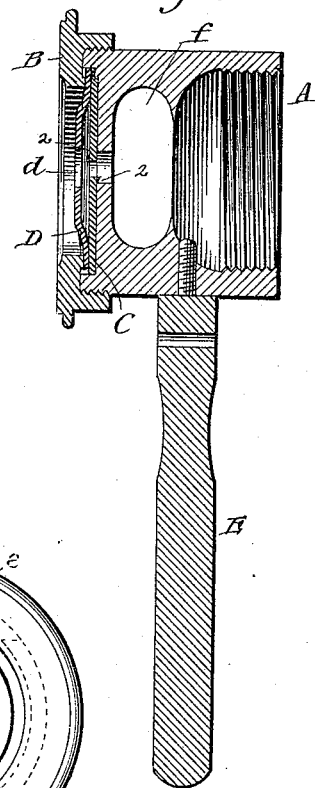
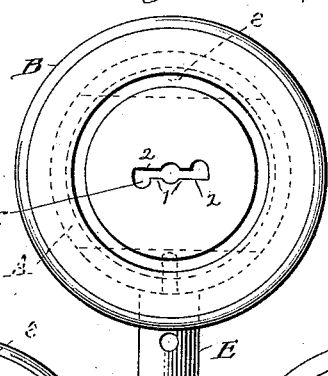
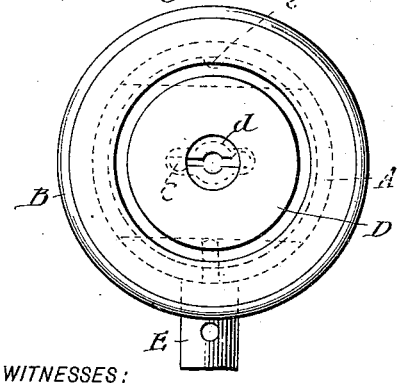
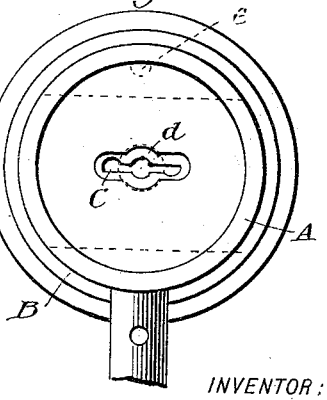
WITNESSES:
J. E. Clark.
C. Sedgwick.
INVENTOR:
R. Gäbel
BY
Munn & Co.
ATTORNEYS

UNITED STATES PATENT OFFICE.

RICHARD GÄBEL, OF DRESDEN, GERMANY.

CUTTING-TOOL.

SPECIFICATION forming part of Letters Patent No. 448,017, dated March 10, 1891.

Application filed March 21, 1890. Serial No. 344,841. (No model.) Patented in Germany August 4, 1888, No. 46,961.

*To all whom it may concern:*

Be it known that I, RICHARD GÄBEL, of Dresden, in the Kingdom of Saxony and Empire of Germany, have invented a new and useful Improvement in Cutting-Tools, (for which, in part—the cutting-plate thereof—I have obtained Letters Patent in Germany, No. 46,961, dated August 4, 1888,) of which the following is a full, clear, and exact specification.

This invention relates to an improvement in tools which may be used as a mandrel or spindle-head upon turning-lathes, drill-making machines, or machines of like character, or as a hand implement for cutting or shaping the material while under rotation in such lathes or machines.

Reference is to be had to the accompanying drawings, forming a part of this specification, in which similar letters and figures of reference indicate corresponding parts in all the views.

Figure 1 is a side elevation of the tool. Fig. 2 is a longitudinal section of the same. Figs. 3 and 4 are respectively a front and a rear view of the same, and Fig. 5 is a front view of the same, the centering-plate being removed.

The body A of the tool, which is hollow and cylindrical in form, may be constructed of iron, steel, or any other suitable metal, and to adapt it for use as a head on a spindle or mandrel it is interiorly threaded at its rear end so that it may be screwed upon such spindle or mandrel. At the sides of said hollow body are formed longitudinal openings *f* for the discharge of the cuttings or shavings removed from the material operated upon by the tool. At the front of said body is located a circular plate C, which is held in place and prevented from turning by means of a stud or studs *e* on the body engaging a recess or recesses in the plate. In the center of the plate C is formed a transverse opening having a circular central portion, and at diagonally-opposite sides of said circular portion the upper and lower walls of said opening are bent over at 1 to form the cutting-edges 2, one projecting inward and the other outward, as shown best in Fig. 2 of the drawings. These cutting-edges may be given any suitable length and width, dependent upon the material to be cut and the shape to be imparted to said material.

In front of the cutting-plate C is located a circular centering-plate D, which is bulged at its center and has formed therein a central opening *d*, corresponding in size to the diameter of the material to be operated upon by the plate C and serving to guide the material to said plate to be cut or shaped. Said plate D is held in place over the plate C by means of a rim or cover B, which is screwed upon the front end of the body A, as shown in Figs. 1 and 2 of the drawings. The centering-plate D may, however, be dispensed with, if desired, as by proper care the material to be operated upon may be guided directly by hand to the cutting-plate C; but said centering-plate is preferably employed.

When the tool is to be used as a hand implement to operate upon material under rotation in a lathe or other like machine, it is provided with a suitable handle E, adapted to be screwed into the body of the tool.

It will be apparent that by employing cutting-plates having cutting-edges of different dimensions and centering-plates having central openings of different diameters material of different diameters may be readily cut and shaped by the use of the tool herein shown and described.

What I claim, and desire to secure by Letters Patent of the United States, is—

1. A cutting-tool having an internally-threaded open rear end and a centrally-apertured front and provided at its sides near its front with discharge-openings, and centrally-apertured cutting and centering plates held spaced apart at its front, substantially as shown and described.

2. In a cutting-tool, the combination, with the body A, open at its rear and apertured at its sides and front, of the plate C, having a central aperture and cutting-edges on opposite sides of said aperture, the plate D, bulged at its front and having a central aperture and held in front of the plate C, and the annular cover B, bearing on the plate D, substantially as shown and described.

In witness whereof I have hereunto set my hand in presence of two witnesses.

RICHARD GÄBEL.

Witnesses:
M. FOCHTMANN,
P. KIRSCHEN.